May 22, 1956 W. A. REIMER 2,746,230
ADJUSTABLE CUTTER MEANS HAVING CROP LIFTING MEANS
Filed Feb. 19, 1954 2 Sheets-Sheet 1
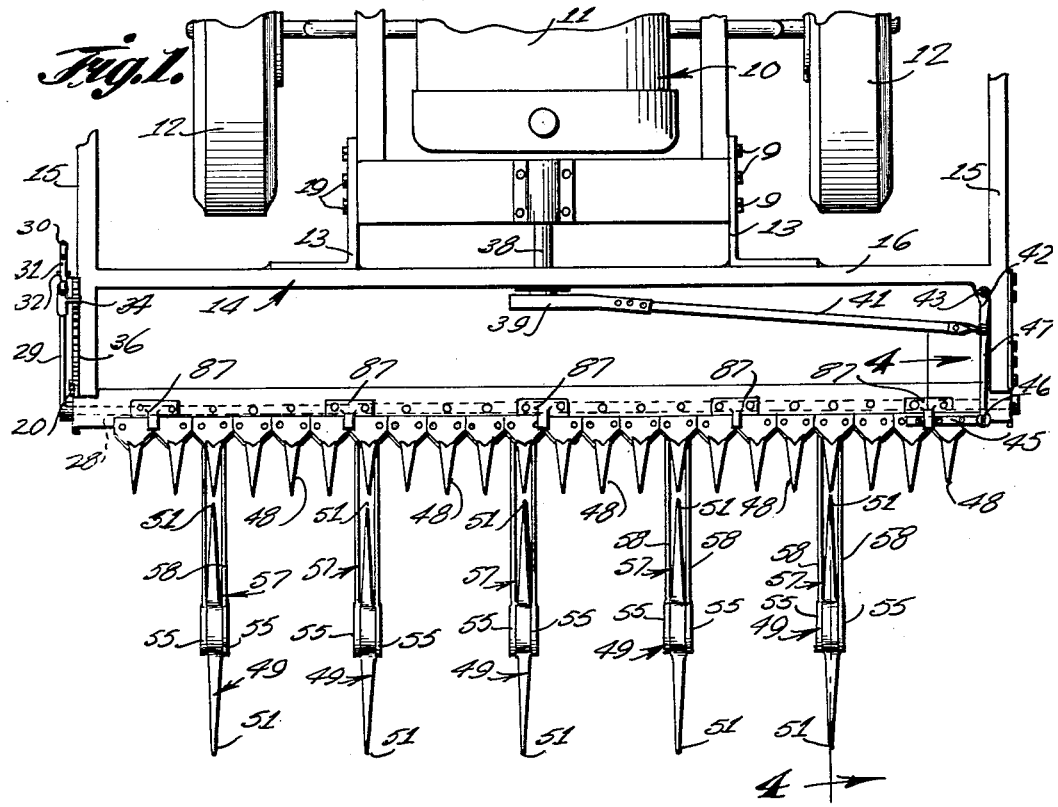
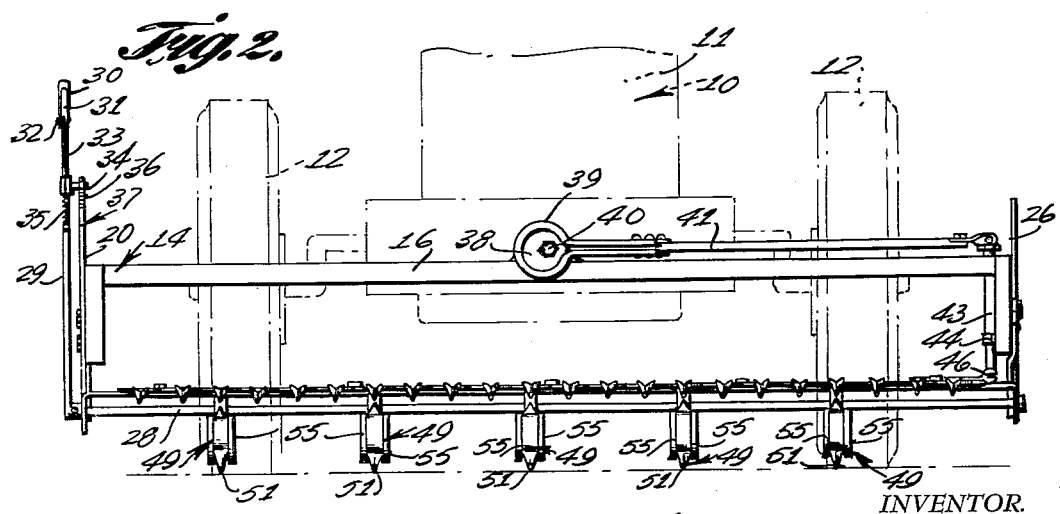
INVENTOR.
William A. Reimer
BY Victor J. Evans & Co.
ATTORNEYS

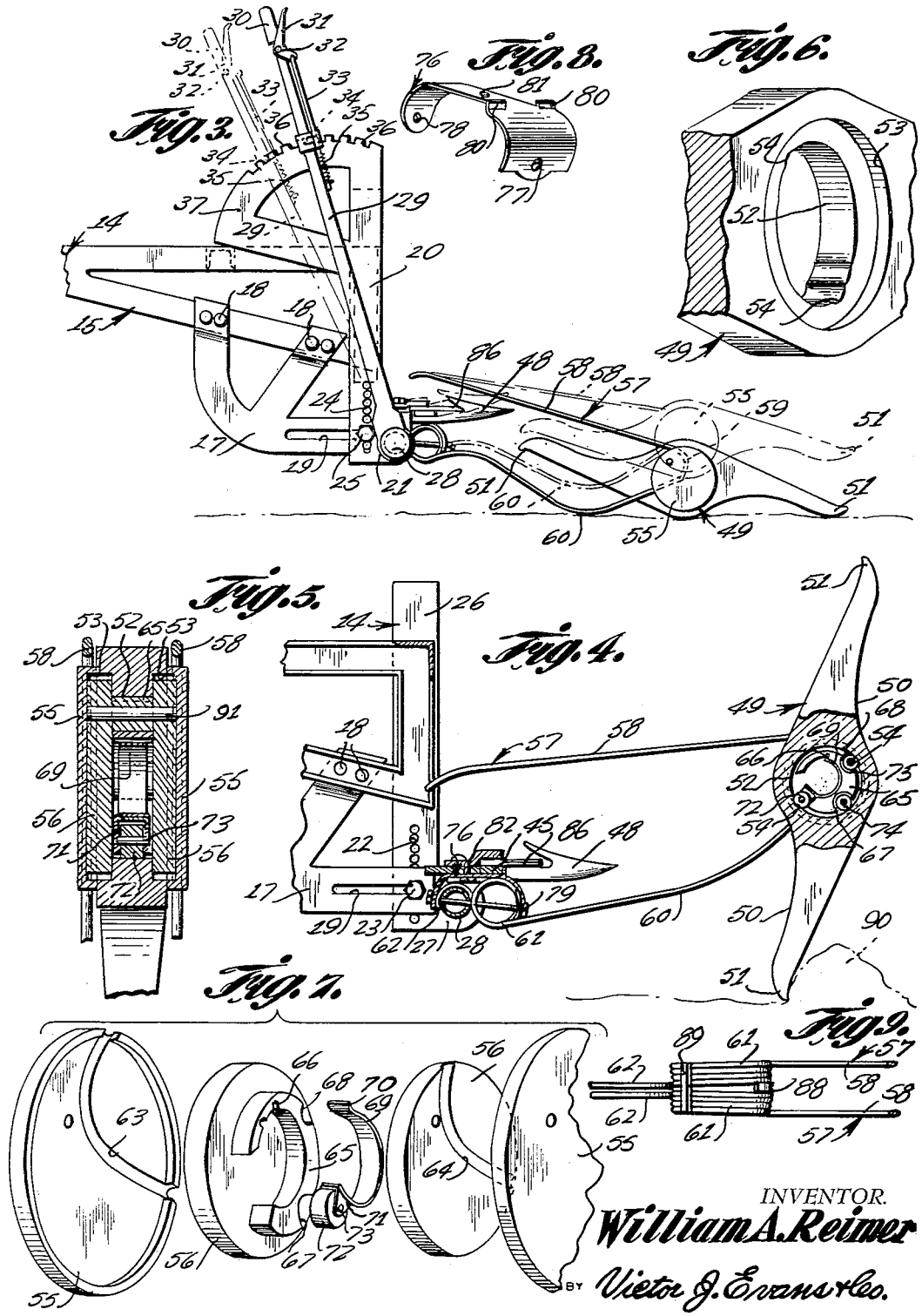

United States Patent Office 2,746,230
Patented May 22, 1956

2,746,230

ADJUSTABLE CUTTER MEANS HAVING CROP LIFTING MEANS

William A. Reimer, Lisbon, Iowa; Lulu H. Reimer, administratrix of William A. Reimer, deceased, assignor to Lulu H. Reimer Application February 19, 1954, Serial No. 411,360

3 Claims. (Cl. 56—312)

This invention relates to agricultural equipment, and more particularly to a universal pickup guard for a grain combine.

The object of the invention is to provide a universal pickup guard for an agricultural implement such as a grain combine wherein the guard of the present invention will lift up any bent over plants or grain and guide these plants into the path of a cutting mechanism whereby all of the grain or growing crops will be effectively cut or severed.

Another object of the invention is to provide a universal pickup guard which will permit the cutting mechanism of the combine or other implement to be used at a higher than usual level above the ground since the attachment of the present invention will lift up any fallen or bent over grain and guide these into the path of the cutting mechanism so that the cutting mechanism can be positioned at a safe distance above the ground whereby the danger of the cutting mechanism accidentally striking rocks or other obstructions will be eliminated.

A further object of the invention is to provide an attachment for an agricultural implement such as a combine or harvesting binder whereby the cutter bar of the implement will not accidentally strike an object and be damaged, and whereby the cutter bar will not pick up corn stalks, trash, and the like as it is operated over uneven ground.

A further object of the invention is to provide a universal pickup guard which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the universal pickup guard of the present invention attached to a vehicle such as a tractor.

Figure 2 is a front elevational view of the present invention.

Figure 3 is an enlarged fragmentary side elevational view of the present invention.

Figure 4 is an enlarged sectional view taken on the line 4—4 of Figure 1.

Figure 5 is an enlarged sectional view taken through one of the hubs or circles of the ground engaging body members.

Figure 6 is a fragmentary perspective view, with parts broken away and in section showing the opening in one of the ground engaging body members.

Figure 7 is an enlarged fragmentary perspective view showing one of the spindles disassembled.

Figure 8 is an enlarged perspective view of one of the plates for attachment to the spring members.

Figure 9 is an enlarged fragmentary plan view of a pair of the spring members for each of the body members.

Referring in detail to the drawings, the numeral 10 designates a vehicle such as a tractor which includes an engine 11, and wheels 12 are provided for the vehicle 10. The numeral 14 designates a frame which is secured to the front of the vehicle 10, Figure 1. The frame 14 includes a pair of spaced parallel side members 15, Figure 3, and a cross piece 16 extends between the side members 15 and is secured thereto for maintaining these members in proper spaced apart relation. A bracket 17 is secured to the front end of each of the side members 15 in any suitable manner, as for example by means of the bolts 18, and each of the brackets 17 is provided with a horizontal slot 19 for a purpose to be later described. Braces 13 are provided for securing the frame 14 to the vehicle 10, and the braces 13 can be secured to the vehicle by suitable securing elements such as the bolts 9.

Adjustably connected to one of the side sections 15 is an upright or standard 20, and projecting forwardly from the upright 20 is a finger 21, Figure 3. A second upright 26 is adjustably connected to the other side section 15, Figure 4, and the upright 26 includes a forwardly projecting finger 27 on its lower end, Figure 4. The upright 20 is provided with a plurality of spaced apertures 24, and a bolt or securing element 25 is adapted to be extended through one of the apertures 24 and through the slot 19 for maintaining the upright 20 immobile in its adjusted position. Similarly, the other upright 26 is provided with a plurality of vertically spaced apertures 22, and a bolt 23 is adapted to be extended through the other slot 19 and through one of the apertures 22 for maintaining the upright 26 immobile in its adjusted position. The lower end of the upright 26 is provided with a forwarding extending finger 27.

A horizontally disposed tube or shaft 28 is journaled between the fingers 21 and 27, and secured to an end of the tube 28 is a lever 29. A hand grip 30 is mounted on the upper end of the lever 29, and a detent mechanism is provided on the lever 29. By pivoting the lever 29 the tube 28 can be rotated or pivoted about a horizontal axis extending through the longitudinal axis thereof. The detent mechanism includes a hand engaging member 31 which is pivotally connected to the lever 29 by a pin 32, and a link 33 connects the member 31 to a detent 34 through the medium of a spring 35. The detent 34 is mounted for movement into and out of engagement with teeth 36 in a sector plate 37, and the spring 35 prevents accidental disengagement of the detent from the teeth 36. Thus, by means of this detent mechanism the tube 28 can be maintained mobile in any of its adjusted positions.

Operated by the vehicle 10 is a power take-off shaft 38, and a bracket 39 is arranged in engagement with the shaft 38. An off center pin 40 is provided for effecting reciprocation of an arm 41, and the arm 41 is connected to a pitman that includes a link 42. The link 42 is connected to the upper end of a shaft 43, and the shaft 43 extends through a bearing 44 and has its lower end connected to a cutter bar 45 by means of a link 47 and ball and socket joint 46. A plurality of guard members 48 are provided for coaction with the cutter bar 45, and the guard members 48 and cutter bar are of conventional construction.

The present invention further includes a plurality of body members 49 which can be made of any suitable material, and the body members 49 are adapted to engage the ground as shown in Figure 3. These body members 49 are arranged forwardly of the cutting mechanism and each includes intermediate curved surfaces 50 and pointed or beveled ends 51. The central portion of each of the body members 49 is enlarged and this enlarged portion is provided with an opening 52. Arranged on each side of the opening 52 is an annular recess 53, Figure 6, and there is further provided a pair of diametrically opposed cutouts 54 which communicate with the openings 52 for a purpose to be later described.

For rotatably supporting the body members 49, there is provided a pair of hub caps 55, Figure 7. There is provided a pair of the hub caps 55 for each body member 49, and interposed between each pair of hub caps 55 is a pair of discs 56 which are arranged in spaced parallel relation with respect to each other. Spring members 57 are provided, and the spring members 57 may be made of heavy gauge wire rod. The spring members 57 each include an upper portion 58 which provides a guide for the grain or crops so that the grain will be guided onto the cutting mechanism where it will be severed. The spring members 57 each include a lower portion 60 which is connected to the upper portion 58 by a curved portion 59. The rear end of the lower portion 60 is shaped to provide a plurality of convolutions or coils 61, and extending from the coils 61 is an arcuate portion 62 which straddles or engages the upper portion of the tube 28, Figure 4. For each of the body members 49 a pair of the spring members 57 are provided. The adjacent faces of the hub cap 55 and disc 56 are provided with curved channels or passageways 63 and 64, Figure 7, and these channels provide a seat for the curved portion 59 of the spring members 57.

The spindle for each of the body members 49 further includes a crescent shaped bracket 65 that is secured to the inner surface of each of the discs 56, Figure 7. The bracket 65 is provided with an inner notch 66 and the bracket 65 is also provided with a pair of outer indentations or recesses 67 and 68. Positioned within the coacting brackets 65 of the pair of discs 66 is a spring member 69 which includes a bent lip 70 for engagement with the notch 66. A pair of apertured ears 71 are secured to an end of the spring member 69, and a pin 73 extends through the ears 71 and through a roller 72. Rollers 74 and 75 are positioned in the recesses 67 and 68 respectively, Figure 4.

In Figure 8 there is shown a plate 76 for connecting the convolutions of the spring members 57 to the cutting mechanism, and the plate 76 of Figure 8 includes or is provided with a pair of opposed apertures 77 and 78 for the projection therethrough of a bolt and nut assembly 79, Figure 4. Ears 80 extend upwardly from the plate 76 for engagement with the cutting mechanism to maintain the parts in their proper aligned relation, and there is further provided an opening 81 in the plate 76 for receiving a bolt 82 that extends from the cutting mechanism.

From the foregoing it is apparent that there has been provided an agricultural implement wherein all grain will be harvested even though it may have fallen from a vertical position. In use, the body members 49 are arranged forwardly of the cutting teeth 86 on the bar 45, and the brackets 87 may be arranged above portions of the cutting mechanism. The spring members 57 connect the body members 49 to the remaining portion of the implement. Bolts 79 extend through the opening 77 and the plate 76 and through a lug 88 that may be secured to the pair of adjacent springs 57. These bolts 79 also extend through the tube 28, and through the apertures 77 and 78 in the plate 76 so that the rear ends of the springs 57 are secured to the tube 28. A clamp 89 is secured as by welding to the coil portions 61 of the springs 57. The upper portion 58 of the springs 57 serves as a guide to insure that the grain to be harvested is directed back onto the cutting mechanism. As the implement is moved along the ground, as for example by the vehicle 10, the body members 49 travel along the ground as shown in Figure 3, and then in the event that the tip 51 of the body member engages a bump or rock, as indicated by the numeral 90, in Figure 4, that particular body member 49 will merely rotate about the spindle made up of the parts shown in Figure 7. Each spindle includes the pair of stationary hub caps 55 as well as the stationary discs 56. The rollers 72, 74 and 75 engage the inner surface of the body member 49 to provide rotatable supports therefor. The rollers 74 and 75 are rotatably mounted in the recesses 67 and 68 by means of the pins 91. Thus, damage to the parts will be prevented since the cutting mechanism can be supported a safe distance above the ground to clear rocks, trash and the like. Adjustment of the body members can be effected by releasing the detent mechanism 34 and rotating the tube 28 to the desired position by means of the lever 29. The rollers 74 and 75 can be mounted on a suitable pin or shaft such as the shaft 91, Figure 5, and the rollers 72, 74 and 75 provide a roller bearing contact between the various moving parts of the spindle within the body members 49. The inherent resiliency of the springs 57 maintain the parts normally in the position shown in solid lines in Figure 3. When the rollers are seated in the cutouts 54, there will be less of a tendency for the body members to rotate away from their normal position as shown in Figure 3.

The universal pickup guard of the present invention can be applied to a side rake as well as other types of implements. If desired the lever 29 can be arranged on the other end of the tube 28 from that shown in the drawing and also the sector plate can be moved to the other side of the machine. By moving the lever 29 and the tube 28, the universal guard can be tilted to different angular positions in relation to the desired height of the combine apron. The present invention takes the place of the rigid or semi-rigid grain saver guard in use when the present invention is used as an attachment on grain harvesting binders and combines. Thus, the cutter bar of the harvesting machine does not have to be operated so near the soil surface when harvesting downed enlarged grain to thereby eliminate the danger of the cutter bar from striking rocks or other objects. The forward point of the guards or body members 49 get under the grain straw and then the upper portions 58 conduct the grain at a safe distance from the ground regardless of how flattened down the grain may be. Since the cutter bar is at a safe clearance above the ground, the machine such as the combine can move along the ground at a normal rate of speed and there will be required less effort on the part of the operator in effecting adjustments in the height of the cutter bar even though the condition of the standing grain may vary since the operator will not have to worry about striking any immovable object. Thus, even though the tip 51 may strike a rock or the like, no damage will be done since the body member or guard will merely rotate. If the cutter bar is raised or adjusted the guards or body members 49 will be adjusted therewith. The mechanism shown in Figure 7 permits rotation of the body member in the event that an object is encountered. If the grain is weedy and it is desirable to cut the grain before separating it from the straw, this can be done with an ordinary mowing machine to thereby eliminate the use of a windrower and also the necessity of attaching a conventional pickup is eliminated. The number of guards 49 used can be varied as desired. The hub caps 55 prevent trash and the like from entering the inner working parts of the spindle.

The body members of the present invention will rotate when striking an immovable object relative to the combine.

What is claimed is:

1. In a universal pickup guard assembly, a frame, a cutter bar on said frame, a horizontally disposed tube rotatably supported by said frame, a plurality of body members arranged forwardly of said frame, spring members connecting said body members to said tube, said body members being mounted for rotation about a horizontal axis, and manually operable means for rotating said tube.

2. The apparatus as described in claim 1, and further including locking means for maintaining the tube immobile in its adjusted positions.

3. In combination, a vehicle, a frame secured to the front of said vehicle and including spaced parallel side sections, a bracket secured to the front end of each of said side sections and provided with a horizontally disposed slot, a standard adjustably connected to each of said side sections and provided with a plurality of vertically spaced apertures, a securing element extending through said apertures and slot for maintaining the standards immobile in their adjusted positions, a finger extending forwardly from the lower end of each standard, a sector plate on the upper end of one of said standards and provided with a plurality of teeth, a tube journaled between said fingers, a manually operable lever secured to an end of said tube and having a hand grip on its upper end, a detent mechanism carried by said lever for engagement with the teeth of said sector plate, a cutting mechanism arranged forwardly of said frame, a plurality of ground engaging body members arranged forwardly of said cutting mechanism and each including a central enlarged portion, the ends of said body member being pointed, and means connecting said body member to said tube to permit rotation of said body members.

References Cited in the file of this patent

UNITED STATES PATENTS

| | | |
|---|---|---|
| 1,359,794 | Davis | Nov. 23, 1920 |
| 2,099,471 | Edgington | Nov. 16, 1937 |
| 2,484,704 | Girodat | Oct. 11, 1949 |